United States Patent [19]
Suyama et al.

[11] Patent Number: 5,098,872
[45] Date of Patent: Mar. 24, 1992

[54] WEAR-RESISTANT MEMBER

[75] Inventors: Shoko Suyama, Yamato; Yutaka Abe, Zushi; Michiyasu Komatsu, Yokohama, all of Japan

[73] Assignee: Kabushiki Kaisha Toshiba, Kawasaki, Japan

[21] Appl. No.: 557,775

[22] Filed: Jul. 26, 1990

[30] Foreign Application Priority Data

Jul. 27, 1989 [JP] Japan .................................. 1-195331

[51] Int. Cl.$^5$ ............................................. C04B 35/58
[52] U.S. Cl. ......................................... 501/97; 501/98
[58] Field of Search ..................................... 501/97, 98

[56] References Cited

U.S. PATENT DOCUMENTS

| | | | |
|---|---|---|---|
| 4,407,970 | 10/1983 | Komatsu et al. | 501/97 |
| 4,407,971 | 10/1983 | Komatsu et al. | 501/97 |
| 4,720,201 | 1/1988 | Nakamura et al. | 501/97 X |
| 4,820,665 | 4/1989 | Ukai et al. | 501/97 |
| 4,879,263 | 11/1989 | Komeya et al. | 501/97 |

FOREIGN PATENT DOCUMENTS

| | | | |
|---|---|---|---|
| 1076315 | 4/1986 | European Pat. Off. | 501/97 |
| 0187539 | 7/1986 | European Pat. Off. | 501/97 |

OTHER PUBLICATIONS

Technical Review No. 54 (1988), p. 34, of NTN Toyo Bearing Co.

*Primary Examiner*—Karl Group
*Attorney, Agent, or Firm*—Oblon, Spivak, McClelland, Maier & Neustadt

[57] ABSTRACT

A wear-resistant member consisting of ceramics containing yttrium oxide and aluminum oxide as a sintering auxiliary component and further titanium oxide, hafnium oxide and aluminum nitride, and mainly formed of silicon nitride. Silicon nitride ceramics possesses the segregation of amorphous phase mainly consisting of the sintering auxiliary component, but its size is 100 μm or below at most. By restricting the segregation size of the amorphous phase to 100 μm or below, sliding property, particularly rolling fatigue properties are improved. And also variability is lowered and the reliability can be highly improved.

11 Claims, 1 Drawing Sheet

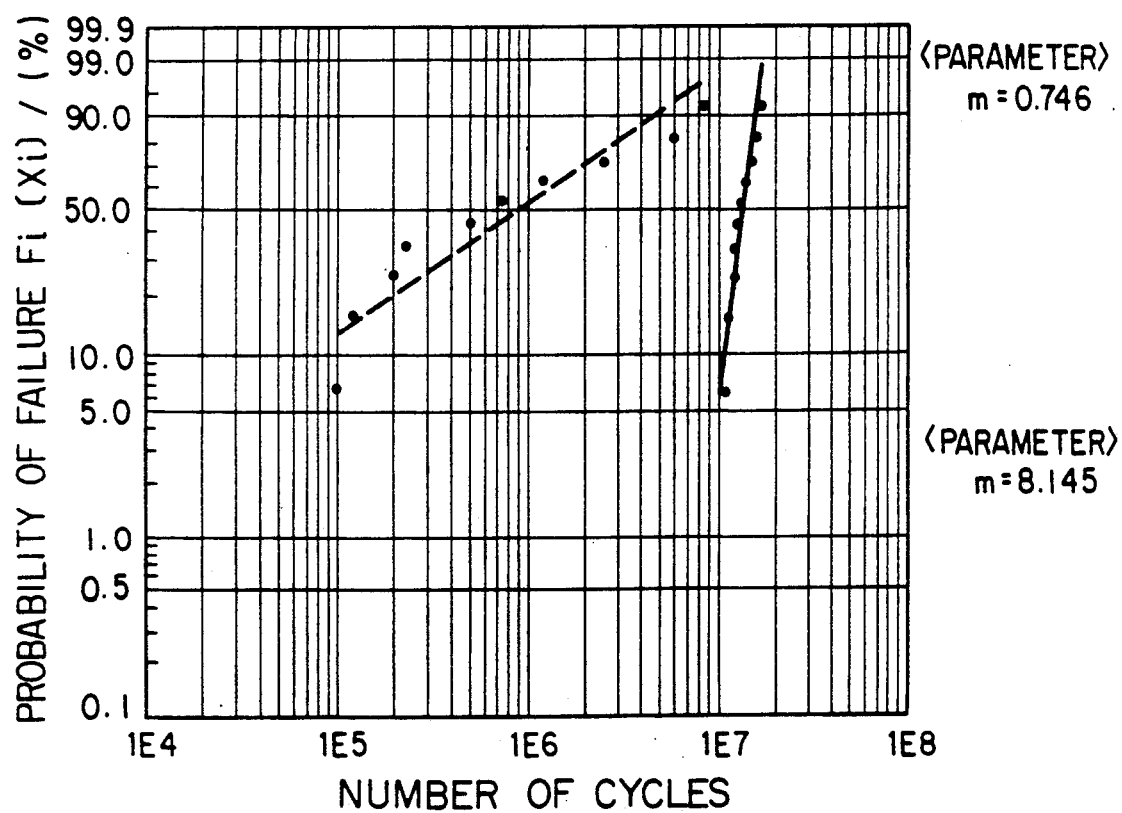

WEAR-RESISTANT MEMBER

FIELD OF THE INVENTION AND RELATED ART STATEMENT

The present invention relates to a wear-resistant member, and particularly to a wear-resistant member suitable for a ball-and-roller bearing member.

Silicon nitride ceramics is expected as a material for mechanical parts to be used under severe conditions because of its excellent heat resistance, corrosion resistance and wear resistance. For example, sintered silicon nitride has been tried to be used as a material for balls and rollers which are rolling members in a bearing.

But, silicon nitride itself is quite poor in sintering property. Ceramics mainly consisting of silicon nitride are produced by utilizing a method which includes pressure-tightening sintering with an additive added or reaction sintering according to nitriding reaction.

Among the above sintering methods, the former which effects pressure-tightening sintering by using the additive promotes liquids sintering by the additive, thereby allowing the sintered material to have high density. Since this method can be used in a combination with various sintering methods, it is commonly used. As an additive for promoting the above liquids sintering, or as a sintering auxiliary, there have been used oxides or nitrides of Mg, Al, Y, Sc, La, or Ce. These are used solely or in a combination of two or more members.

But the above sintering auxiliary is left behind as amorphous phase in the crystalline grain boundary in the sintered body depending on the amount added. This amorphous phase softens at a high temperature, deteriorating the high-temperature strength of the silicon nitride ceramics. Therefore, the sintering auxiliaries are under various studies about their amounts to be added and compositions.

A specific method for producing a sintered silicon nitride is as follows:

First, a sintering auxiliary is added to silicon nitride powder for thoroughly mixing to prepare raw material powder. Then, the mixture powder thus prepared is subjected to a press molding or injection molding to be formed into a molded product. The molded product is sintered under normal pressure or in the atmosphere under pressure. And a hot press method is employed to effect the molding and the sintering in a single process. An appropriate method is selected depending on the shape and use of the product produced.

Silicon nitride ceramics prepared by sintering under normal pressure generally has larger pores formed within the sintered product and a relatively lower pressure-resistant strength. Therefore, when silicon nitride ceramics are used as a bearing member for example, the hot press method which does not easily generate pores or a method which combines an HIP (Hot Isostatic Pressing) treatment with an atmospheric pressure sintering so that a dense sintered product is produced.

As described above, sintering methods which utilize the excellent properties of silicon nitride sintered best have been studied from various angles. However, a bearing produced from silicon nitride ceramics has a draw-back that rolling fatigue life which is a significant property as a bearing is largely varied. Using the HIP treatment together and using a sintered silicon nitride having its porosity lowered improve relative rolling fatigue properties but cannot decrease dispersion of rolling fatigue life so much yet.

Meanwhile, ceramics bearings are often used as a bearing which is used in molten metal where a metallic bearing cannot be used. Then, they are required to be excellent in corrosion resistance to acid, alkali and molten metal and so on. However, they have a disadvantage that they generally tend to be corroded starting from a portion where the sintering auxiliary is contained in the silicon nitride ceramics.

OBJECT AND SUMMARY OF THE INVENTION

Accordingly, an object of the present invention is to provide a highly reliable, wear-resistant member which excels in sliding property, particularly in rolling fatigue properties, and does not have a high dispersion.

Another object of the present invention is to provide a wear-resistant member excelling in corrosion resistance.

The wear-resistant member of the present invention is a wear-resistant member which contains ceramics having silicon nitride as a main component and containing a sintering auxiliary component. This ceramics contains an amorphous phase which mainly consists of the above sintering auxiliary component, and the amorphous phase has a segregation size of 100 $\mu$m or below.

A method for producing the wear-resistant member of the present invention includes a step of adding and mixing 0.1 to 5% by weight of yttrium oxide powder as a sintering auxiliary to silicon nitride powder, a step of using the above mixed powder as a raw material powder and molding it into a desired shaped wear-resistant member, a step of sintering the above molded product so as to have porosity of 2% or below, and a step of subjecting the above sintered product to Hot Isostatic Pressing (hereinafter referred to as HIP) so as to make its porosity 1% or below.

The ceramics used in the present invention is a sintered body mainly consisting of silicon nitride and contains yttrium oxide and aluminum oxide as a sintering auxiliary component, and further titanium oxide, hafnium oxide and aluminum nitride.

The above yttrium oxide and aluminum oxide contained as the sintering auxiliary component are present as an amorphous phase in the sintered body. This amorphous phase generally exists in crystalline grain boundary but is segregated to exist depending on a production method of the sintered body. This segregation of the amorphous phase is formed by plural dispersion ranging from the inside to the surface of the sintered body. Therefore, there are segregated portions in various sizes.

The present invention was accomplished with attention to the fact that the above segregation of the amorphous phase has a great effect on the sliding property. In the wear-resistant member of the present invention, the segregation of the amorphous phase existing in the sintered body is defined to be less than 100 $\mu$m at the most. The reason of the definition will be described below.

Heretofore, the rolling fatigue life of ceramics bearings was considered to be influenced by the presence or absence of pores which were formed through sintering. To remove the pores, the HIP treatment was effected so as to elongate the service life. But, even among the ceramics which were through the HIP treatment and contained only a small number of pores, some were short in rolling fatigue life. Thus, it was not fully clarified what basic factor affected the rolling fatigue life.

Detailed examination was conducted on electron microscope reflection electron image of the inside structure of silicon nitride ceramics which had been subjected to the HIP treatment. It was found that the pores which had previously existed had almost disappeared as a result of the HIP treatment, but the amorphous phase mainly consisting of the sintering auxiliary component which had rather high flowability flew into the portions where the pores were present and segregated there.

The inventors clarified through their experiments that when such silicon nitride ceramics in which the segregated portions of amorphous phase existed was used as a wear-resistant member such as a bearing, peeling tended to occur in the segregated portions if any of such segregated portions had a size exceeding a certain value, resulting in shortening the service life.

That is, the segregation of amorphous phase existing in plural and various sizes does not cause peeling which may be an obstacle to practical use where its size is 100 $\mu$m or below even if its size is large. Therefore, the wear-resistant member of the present invention uses all silicon nitride ceramics which have 100 $\mu$m or below of the segregation size of all amorphous phase, to prevent peeling of the segregated portions, improve sliding property of the wear-resistant member, particularly rolling fatigue properties and reducing dispersion.

The above segregated amorphous phase has no obstacle to practical use when the segregation size is 100 $\mu$m or below as described above but it is preferably be 50 $\mu$m or below.

The above amorphous phase mainly consists of sintering auxiliary component. Its segregation is formed when the amorphous phase which has a relatively high flowability is condensed by the HIP treatment into the pores formed when sintering as described above and exists on the triple point of grain boundary. The segregation size of the amorphous phase is represented by the diameter of a circle surrounding the segregation in question.

The wear-resistant member of the present invention consisting of silicon nitride ceramics which is controlled to have the segregated amorphous phase in a size of 100 $\mu$m or below is produced as follows.

Silicon nitride powder is added with a certain amount of a sintering auxiliary powder and mixed fully to prepare a raw material powder. As the sintering auxiliary, yttrium oxide powder is used at a minimum. And, yttrium oxide is preferably used as mixed with another component. It is preferable to use aluminum oxide powder together.

Yttrium oxide is used to promote liquid phase sintering to make a high-density sintered body, and if its added amount is excessively small, the sintering promoting effect cannot be obtained sufficiently. If it is excessively large conversely, the segregation of the amorphous phase which is present within the sintered silicon nitride becomes greater, lowering the rolling fatigue life and causing variability. Therefore, the added amount of yttrium oxide is preferably 1 to 5% by weight. Yttrium oxide is sufficient when used in an amount up to 5% by weight to provide a suitable effect of the present invention. And, aluminum oxide is also preferably used in an amount of 1 to 5% by weight because of the same reason as above.

As the sintering auxiliary, at least one member selected from the group consisting of titanium oxide, aluminum nitride and hafnium oxide may be added in a range of 0.1 to 5% by weight. These component contribute in promoting sintering. Particularly, addition of titanium oxide is effective in improving the sliding property like the rolling fatigue property.

Titanium oxide and hafnium oxide work as a sintering promoting agent in the sintering process and contribute in lowering the amount of yttrium oxide used. After sintering, for example titanium oxide reacts with silicon nitride to produce titanium nitride. And hafnium oxide exists as it is. These titanium nitride and hafnium oxide are dispersed in the grain boundary in the state cf grain to reinforce the grain boundary. Thus, the rolling fatigue life properties can be improved. Particularly, the addition of titanium oxide improves the rolling fatigue life extensively.

Titanium oxide and hafnium oxide added do not improve the rolling fatigue life if used in a small amount but if used excessively, the effect to be improved is limited. Practically, they are preferably used in an amount of 5% by weight or below.

The aforementioned various sintering auxiliaries enlarge the segregation of the amorphous phase if their total amount is excessively large but cannot provide a sufficient sintering promoting effect if used in an excessively small amount. Therefore, they are preferably used in the range of 2 to 15% by weight, although variable depending on the component used.

Then, an organic binder is added to the above raw material powder if required, and a desired shaped wear-resistant member is molded. In this molding process, any known molding processes can be employed such as press molding, extrusion molding, injection molding and others. Thus molded product is then sintered by atmosphere pressure sintering or the like to produce a sintered silicon nitride. The above molding process and the sintering process may be combined into one by using hot pressing.

In the above sintering step, it is important to set conditions so that porosity of the sintered body obtained becomes 2% or less. When the porosity of the sintered body obtained in the sintering step exceeds 2%, the amorphous phase which is mainly formed of the sintering auxiliary component is concentrated when the pores disappear by the next HIP process, tending to cause the segregation size to exceed 100 $\mu$m. Specific conditions are for example as follows. When sintering, the atmosphere pressure is preferably 1 atm to 9 atm. The sintering temperature preferably ranges from 1650° C. to 1900° C. The sintering temperature is preferably retained from 1 hour to 4 hours.

Then, the above sintered body is subjected to the HIP treatment to obtain the wear-resistant member formed of silicon nitride ceramics whose segregation of the amorphous phase is controlled to have a segregation size of 100 $\mu$m or below. This HIP treatment has its conditions set so that the porosity does not exceed 1%. This is because when the porosity after the HIP treatment exceeds 1%, the wear-resistant member cannot possess a sufficient pressure-resistant strength.

As described above, using silicon nitride ceramics having the segregation size of the amorphous phase of 100 $\mu$m or below makes it possible to provide a wear-resistant member which has a long rolling fatigue life and variable service lives. And, the addition of yttrium oxide as the sintering auxiliary is limited to 5% by weight or below and titanium oxide or the like is added thereto to allow improvement of the rolling fatigue life and obtaining a wear-resistant member whose life is not varied much and reliability is high.

BRIEF DESCRIPTION OF THE DRAWING

FIG. 1 is a graph showing the results of rolling fatigue test of the sintered silicon nitride obtained by one embodiment of the present invention as compared with a conventional one by Weibull plotting.

DETAILED DESCRIPTION OF THE PREFERRED EMBODIMENTS

Examples of the present invention will be described below.

EXAMPLE 1

To $Si_3N_4$ powder were added as a sintering auxiliary 5% by weight of $Y_2O_3$ powder, 2% by weight of $Al_2O_3$, and 1% by weight of $TiO_2$ powder. They were thoroughly mixed to prepare raw material powder. Then, the above raw material powder was combined with about 5% by weight of an organic binder and mixed well.

Then, using the above mixed powder, a plural number of pellet-shaped molded products were prepared by a press molding with the molding pressure varied in the range of 1 t/cm² to 2 t/cm². And, the obtained pellet-shaped molded products were subjected to the atmosphere pressure sintering in nitrogen gas. The sintering conditions included an atmospheric pressure of 1 atm to 10 atm, a sintering temperature of 1700° C. to 1900° C., and a sintering time (retention time at the sintering temperature) of 1 hour to 4 hours. At this point, each sintered body was measured for its porosity.

After that, the above plural sintered bodies were subjected to the HIP treatment to obtain a plural bearing silicon nitride members. The HIP treatment was effected under a pressure of 1000 atm with various treating temperatures of 1700° to 1900° C. and treating times of 0.5 hour to 2 hours. The silicon nitride members through the HIP treatment were measured for their porosity.

The above plurality of bearing silicon nitride members thus obtained were measured for the segregation size of the amorphous phase. The segregation size here means the maximum diameter (diameter of a circle including the segregation) of the largest segregation among the others of a plurality of amorphous phases existing within the sintered silicon nitride. The segregation size was measured by scan model electron microscope (SEM). Table 1 shows the segregation size as well as the production conditions of each bearing silicon nitride member.

It is seen from Table 1 that varying the molding, sintering and HIP conditions varies the segregation size of the amorphous phase even when the raw material powers with the same composition are used. To restrict the segregation size to 100 μm or below, it is seen to be effective that the porosity of the sintered body prior to the HIP treatment be made as small as possible.

Then, these silicon nitride members were measured for their rolling fatigue life.

To measure the rolling fatigue life, a simple-shaped slight type tester was used to examine the rolling fatigue life of the silicon nitride member itself and its variability. To clarify the working load and its repetitive times, the rolling fatigue life was determined on a sample disk and steel balls positioned as separated by 120 degrees on the circumference of a circle. The rolling fatigue life was measured under a load of 400 kgf and a revolution of 1500 r.p.m. until the exfoliation occurs on the sample disk of the sintered silicon nitride. When the steel ball was separated earlier, it was replaced with another one, and the test was continued.

The results of the rolling fatigue test are also shown in Table 1.

TABLE 1

|  | Sample No | Molding Pressing pressure (kg/cm²) | Atmosphere pressure sintering | | | HIP treatment | | Porosity | | Segregation size (μm) | Rolling fatigue life (cycle) |
| --- | --- | --- | --- | --- | --- | --- | --- | --- | --- | --- | --- |
|  |  |  | Pressure (atm) | Temp (°C.) | Time (hr) | Temp (°C.) | Time (hr) | Before HIP (%) | After HIP (%) |  |  |
| Example 1 | 1 | 1000 | 1 | 1650 | 2 | 1700 | 0.5 | 5 | 1 | 300 | $2.7 \times 10^2$ |
|  | 2 | 1000 | 5 | 1650 | 4 | 1750 | 1 | 3.5 | 0.5 | 250 | $1.2 \times 10^3$ |
|  | 3 | 1000 | 5 | 1700 | 1 | 1700 | 1 | 3.2 | 1.5 | 200 | $4.3 \times 10^3$ |
|  | 4 | 1000 | 5 | 1700 | 1.5 | 1700 | 1 | 3.0 | 1.2 | 150 | $2.6 \times 10^4$ |
|  | 5 | 1000 | 5 | 1700 | 2 | 1800 | 1 | 2.5 | 0.1 | 120 | $6.6 \times 10^5$ |
|  | 6 | 1000 | 5 | 1750 | 1 | 1800 | 2 | 2 | 0.1 | 100 | $8.8 \times 10^6$ |
|  | 7 | 1000 | 5 | 1775 | 1 | 1750 | 0.5 | 1.5 | 0.4 | 50 | $>10^7$ |
|  | 8 | 2000 | 5 | 1775 | 2 | 1750 | 0.5 | 1.2 | 0.2 | 30 | $>10^7$ |
|  | 9 | 1000 | 5 | 1800 | 1 | 1800 | 1 | 0.8 | 0 | 20 | $>10^7$ |
|  | 10 | 1000 | 5 | 1800 | 2 | 1800 | 1 | 0.5 | 0 | <10 | $>10^7$ |
|  | 11 | 1000 | 5 | 1800 | 3 | 1750 | 1 | 0.3 | 0 | <10 | $>10^7$ |
|  | 12 | 1000 | 5 | 1800 | 4 | 1800 | 0.5 | 0.2 | 0 | <10 | $>10^7$ |
|  | 13 | 2000 | 9 | 1800 | 4 | 1800 | 1 | 0.2 | 0 | <10 | $>10^7$ |

It is seen from Table 1 showing the results of rolling fatigue test that even when the segregation size of the amorphous phase is maximum, a long-life bearing silicon nitride member can be obtained when the size is not larger than 100 μm. And its rolling fatigue life is longer by at least 10 times as compared with a silicon nitride member having a larger segregation size.

As in this Example, a silicon nitride member whose segregation size existing in the sintered silicon nitride was totally 100 μm or below was used to produce a ceramics bearing ball with a nominal diameter of 9.525 mm. The obtained ceramics bearing ball had a long rolling fatigue life to support the above-mentioned test results and was excellent as a bearing ball.

As the sintering auxiliary, when one not having the same composition as in this Example is used, for example one containing $Y_2O_3$ in a slightly greater amount, the rolling fatigue life can be improved suitably by controlling the segregation size. Further, since it was clarified that the rolling fatigue life and the segregation size are related, there was obtained a certain guideline for the production conditions in manufacturing a bearing silicon nitride member.

EXAMPLE 2

To $Si_3N_4$ powder were added as a sintering auxiliary 5% by weight of $Y_2O_3$ powder, 1% by weight of $TiO_2$ powder and 2% by weight of $Al_2O_3$ powder. They were fully mixed to prepare a raw material powder.

Then, the raw material powder was added with about 5% by weight of an organic binder and mixed well. Press-molding the mixture under a molding pressure of 750 kg/cm$^2$ produced a pellet-shaped molded product. Then the pellet-shaped molded product was sintered in nitrogen gas pressurized to 5 atm at 1750° C. for four hours.

After that, the above sintered silicon nitride was subjected to the HIP treatment to produce a bearing silicon nitride member. The HIP treatment was effected in nitrogen gas under a pressure of 1000 atm at 1800° C.

A plurality of samples of the bearing silicon nitride member having the above composition were subjected to the rolling fatigue life test in the same way as in Example 1, and Weibull probability paper was used for Weibull plotting of breaking probability. The segregation size of each sample amorphous phase was 100 μm or below at the maximum.

Breaking probability by the above rolling fatigue life test is shown by a solid line in FIG. 1. This test result was plotted into a straight line, whose inclination was used to obtain parameter m. It is seem from parameter m that the rolling fatigue life is variable. Specifically, a greater parameter m means that the straight line has a greater inclination and the rolling fatigue life is distributed in a narrow range, indicating a small variability. Conversely, a smaller parameter m means that the straight line has a smaller inclination and the rolling fatigue life is distributed in a wide range, indicating a large variability.

COMPARATIVE EXAMPLE 1

To $Si_3N_4$ powder were added as a sintering auxiliary 5% by weight of $Y_2O_3$ and 2% by weight of $Al_2O_3$ powder. They were thoroughly mixed to prepare a raw material powder. This raw material powder was used to prepare a bearing silicon nitride member in the same way as in Example 2.

For this bearing silicon nitride member, a plurality of samples were subjected to the rolling fatigue life test in the same way as in Example 2 and the results were Weibull plotted. FIG. 1 shows the results by a dotted line together with the results of Example 2. The segregation size of the amorphous phase of the sample in Comparative Example 1 exceed 100 μm when greatest.

It is clear from FIG. 1 that the bearing silicon nitride member according to Comparative Example 1 has a smaller parameter m, and the plotted straight line inclines at a small angle against the horizontal axis in a wide range, and the fatigue life is largely varied. On the other hand, the bearing silicon nitride member according to Example 1 has a large parameter m and the plotted straight line inclines in a large angle against the horizontal axis in a narrow range, and the fatigue life varies a little. And, the fatigue life value itself is excellent as compared with Comparative Example 1.

The raw material powder of the composition used in the above Example 2 was molded into a prescribed shape by using a metal press then sintered. And the sintered body was fabricated into a silicon nitride ball bearing having a nominal diameter of ⅜ inch (9.525 mm). The obtained silicon nitride ball bearing has excellent rolling fatigue life and corrosion resistance to support the aforementioned test results, and is very good as a rolling bearing product.

EXAMPLE 3

As a sintering auxiliary $Y_2O_3$ powder, $Al_2O_3$ powder, AlN powder, $TiO_2$ powder and $HfO_2$ powder were respectively added to $Si_3N_4$ powder in the component ratio as shown in Table 2 to prepare a plurality of raw material powders.

These raw material powders were added with about 5% by weight of an organic binder and thoroughly mixed. The mixtures were respectively pressmolded under a molding pressure of 750 kg/cm$^2$ to produce pellet-shaped molded products. The obtained pellet-shaped molded products were sintered in nitrogen gas pressurized to 5 atm at 1750° C. for four hours.

Then, the above plural sintered bodies were subjected to the HIP treatment to produce a plurality of bearing silicon nitride members. The HIP treatment was effected in nitrogen gas pressurized to 1000 atm at 1800° C.

Each silicon nitride member thus obtained was measured for the segregation size of the amorphous phase in the same way as in Example 1. Porosity before and after the HIP treatment was also measured. The results obtained are shown together with the raw material compositions in Table 2 (Sample Nos. 5 to 13 ).

These bearing silicon nitride members were subjected to the rolling fatigue life test (in the same way as in Example 2) and the corrosion-resistant test. The corrosion-resistant test was conducted using three types of solutions of HCl, $HNO_3$, and $H_2SO_4$ at 90° C., into which the silicon nitrogen members were respectively immersed for 100 hours. After that the silicon nitride members were measured for their weight loss ratio and strength retention.

These rolling fatigue test results and corrosion-resistant test results are also shown in Table 2. Weight loss and strength retention were indicated in percentage.

COMPARATIVE EXAMPLE 2

As shown in Table 2, bearing silicon nitride members were produced by following the procedure of Example 3 excepting that the raw material powder had its added mount of $Y_2O_3$ powder varied in the range of 20% by weight to 6% by weight.

The obtained various bearing silicon nitride members were subjected to the measurement of porosity and segregation size, rolling fatigue life test and corrosion-resistant test by following the procedure of Example 3. The results obtained are shown in Table 2 (Sample Nos. 1 to 4 ).

TABLE 2

| | Sample No. | Sintering auxiliary composition (wt %) | | | | | Porosity (%) | | Segregation size (μm) | Rolling fatigue life | |
| | | $Y_2O_3$ | $Al_2O_3$ | $TiO_2$ | AlN | $HfO_2$ | Before HIP | After HIP | | $L_{50}$ (cycle) | Parameter m |
| --- | --- | --- | --- | --- | --- | --- | --- | --- | --- | --- | --- |
| Comparative Example 2 | 1 | 20 | 5 | 1 | — | — | 0.8 | 0.2 | 300 | $3.6 \times 10^3$ | 0.8 |
| | 2 | 15 | 5 | 1 | — | — | 0.5 | 0 | 250 | $1.2 \times 10^4$ | 0.9 |
| | 3 | 10 | 5 | 1 | — | — | 0.3 | 0 | 200 | $5.8 \times 10^4$ | 1.1 |

TABLE 2-continued

|  | | | | | | | | | | | |
|---|---|---|---|---|---|---|---|---|---|---|---|
| Example 3 | 4 | 7.5 | 2 | 1 | — | — | 0.3 | 0 | 105 | $9.1 \times 10^5$ | 1.8 |
|  | 5 | 5 | 2 | 1 | — | — | 0.2 | 0 | <10 | $>10^7$ | 7.2 |
|  | 6 | 4 | 2 | 1 | — | — | 0.3 | 0 | <10 | $>10^7$ | 8.3 |
|  | 7 | 3 | 2 | 1 | — | — | 0.5 | 0 | <10 | $>10^7$ | 9.0 |
|  | 8 | 2 | 2 | 1 | — | — | 0.6 | 0 | <10 | $>10^7$ | 9.4 |
|  | 9 | 1 | 2 | 1 | — | — | 0.8 | 0.1 | <10 | $>10^7$ | 11.0 |
|  | 10 | 5 | 2 | — | — | 1 | 0.3 | 0 | <10 | $>10^7$ | 9.5 |
|  | 11 | 5 | 2 | 0.5 | 3 | — | 0.2 | 0 | <10 | $>10^7$ | 10.2 |
|  | 12 | 1 | 2 | — | — | 1 | 0.7 | 0 | <10 | $>10^7$ | 11.5 |
|  | 13 | 1 | 1 | 1 | 1 | — | 1 | 0.1 | <10 | $>10^7$ | 12.0 |

|  | Sample No. | HCl (8.2M) | | HNO$_3$ (4.8M) | | H$_2$SO$_4$ (3.1M) | |
|---|---|---|---|---|---|---|---|
|  |  | Weight loss | Strength retention | Weight loss | Strength retention | Weight loss | Strength retention |
| Comparative Example 2 | 1 | 7.2 | 35 | 4.1 | 40 | 2.5 | 45 |
|  | 2 | 5.9 | 40 | 3.6 | 45 | 2.2 | 50 |
|  | 3 | 4.8 | 50 | 2.8 | 50 | 1.8 | 56 |
|  | 4 | 3.3 | 55 | 1.9 | 60 | 1.1 | 65 |
| Example 3 | 5 | 2.0 | 60 | 1.0 | 70 | 0.5 | 80 |
|  | 6 | 1.6 | 65 | 0.7 | 75 | 0.4 | 85 |
|  | 7 | 1.2 | 70 | 0.5 | 82 | 0.3 | 90 |
|  | 8 | 0.8 | 75 | 0.2 | 90 | 0 | 95 |
|  | 9 | 0.1 | 80 | 0 | 98 | 0 | 100 |
|  | 10 | 1.9 | 65 | 0.3 | 83 | 0.5 | 85 |
|  | 11 | 1.8 | 62 | 0.2 | 85 | 0.4 | 85 |
|  | 12 | 0.1 | 88 | 0 | 98 | 0 | 90 |
|  | 13 | 0.1 | 85 | 0 | 100 | 0 | 100 |

It is clear from Table 2 that the silicon nitride members obtained in the above Example 3 are excelling in rolling fatigue life and all of their sample plate have cleared $10^7$ cycles. This is a value larger by 10 times or more of a conventional steel member. And, the corrosion resistance was also very good. On the other hand, the silicon nitride members obtained in Comparative Example 2 had a short rolling fatigue life, and variability was wide.

What is claimed is:

1. A wear-resistant member comprising: ceramics containing a crystal phase consisting essentially of silicon nitride and an amorphous phase consisting essentially of a sintering auxiliary component, a segregation of said amorphous phase having a size of 100 μm or below.

2. A wear-resistant member according to claim 1, wherein said ceramics contains 0.1 to 5% by weight of yttrium oxide as said sintering auxiliary component.

3. A wear-resistant member according to claim 2, wherein said ceramics further contains 0.1 to 5% by weight of aluminum oxide as said sintering auxiliary component.

4. A wear-resistant member according to claim 3, wherein said ceramics further contains 0.1 to 5% by weight of at least one member selected from the group consisting of titanium oxide, hafnium oxide and aluminum nitride as said sintering auxiliary component.

5. A wear-resistant member according to claim 1, wherein said segregation has the maximum size of 50 μm or below.

6. A wear-resistant member according to claim 1, wherein said wear-resistant member is a bearing member.

7. A method for producing a wear-resistant member comprising: a step of adding and mixing 0.1 to 5% by weight of yttrium oxide powder as a sintering auxiliary to silicon nitride powder, a step of using said mixed powder as a raw material powder and molding it into a desired shaped wear-resistant member, a step of sintering said molded product so as to have a porosity of 2% or below, and a step of subjecting said sintered body to Hot Isostatic Pressing treatment so as to make its porosity 1% or below.

8. A method for producing a wear-resistant member according to claim 7, wherein in said mixing step, 0.1 to 5% by weight of aluminum oxide powder is further added as the sintering auxiliary.

9. A method for producing a wear-resistant member according to claim 8, wherein 0.1 to 5% by weight of at least one member selected from the group consisting of titanium oxide, hafnium oxide and aluminum nitride is added as the sintering auxiliary in said mixing step.

10. A wear-resistant member, comprising: a sintered ceramic containing a crystal phase consisting essentially of a silicon nitride and an amorphous phase consisting essentially of a sintering auxiliary component, said amorphous phase primarily existing as segregations having a size of 100 μm or less in the body of the sintered ceramic.

11. The wear-resistant member of claim 10, wherein said segregations exist on the triple point of the grain boundary of said sintered ceramic.

* * * * *

UNITED STATES PATENT AND TRADEMARK OFFICE
CERTIFICATE OF CORRECTION

PATENT NO. : 5,098,872
DATED : MARCH 24, 1992
INVENTOR(S) : SUYAMA ET AL

It is certified that error appears in the above-identified patent and that said Letters Patent is hereby corrected as shown below:

| Col. | Line | |
|---|---|---|
| 1, | 53, | delete "has" and insert --have--; |
| 2, | 67, | delete "were" and insert --went--; |
| 3, | 32, | delete "be"; |
| 6, | 6, | delete "the" (second occurrence); |
| 6, | 7, | delete "powers" and insert --powder--; |
| 7, | 10, | insert --.-- after "product"; |
| 7, | 18, | delete "cf" and insert --of--; |
| 7, | 28, | delete "seem" and insert --seen--; |
| 8, | 21, | delete "pressmolded" and insert --press-molded--. |

Signed and Sealed this

Twenty-fourth Day of August, 1993

*Attest:*

BRUCE LEHMAN

*Attesting Officer*   *Commissioner of Patents and Trademarks*